DUCT

Original Filed July 16, 1945 2 Sheets-Sheet 1

INVENTOR.
FRED. A. GREENWALD
BY A. Graham Owen
ATTORNEY

DUCT

Original Filed July 16, 1945 2 Sheets-Sheet 2

INVENTOR.
FRED A. GREENWALD
BY A. Denham Owen
ATTORNEY

Reissued Jan. 2, 1951

Re. 23,317

UNITED STATES PATENT OFFICE 23,317

DUCT

Fred A. Greenwald, Los Angeles, County, Calif., assignor to Arrowhead Rubber Company, Los Angeles, Calif., a corporation of California Original No. 2,468,493, dated April 26, 1949, Serial No. 605,330, July 16, 1945. Application for reissue August 23, 1950, Serial No. 180,949

8 Claims. (Cl. 138—76)

Matter enclosed in heavy brackets [ ] appears in the original patent but forms no part of this reissue specification; matter printed in italics indicates the additions made by reissue

This invention relates to improvements in duct or tubing.

One of the objects of the invention is to provide a duct made from woven fabric and one which will withstand excessively high temperatures applied either inside or outside.

Another object of the invention is to provide an impervious, bendable, high-heat-resistant duct composed of a plurality of sheets of woven fabric having the sealing coating between the layers of fabric, thereby locking in the sealing material between the layers, so that it cannot be chipped and is not subject to direct contact with the vapors passing through the duct, and in which the fabric on the inside of the duct is uncoated.

Another object of the invention is to provide a construction in fabric duct comprised of two thin-walled pieces of woven fabric in which the long threads of each layer cross in opposite directions and at substantially like angles so as to give equal stress and strain on bending and serve to resist wrinkling and bursting.

Another object of the invention is to provide a duct made from two layers of woven fabric and in which each sheet is joined along its edge by being lapped onto itself, with the lap joint in one layer being substantially 180° away from the lap joint in the other layer.

Another object of the invention is to provide a high-heat-resistant duct capable of holding high pressures with a low leak characteristic by making it of an outer layer of woven fabric coated on both sides with a plastic material and of an inner layer of woven fabric coated only on its outside so this coating is enclosed between the inner and outer layers.

The above and other objects and advantages of this invention will become apparent from the following description of a preferred form of this new product, pursuant to Revised Statutes section 4888. It is the intention, pursuant to the above statute, not to limit the invention to the specific forms used for illustrative purposes.

In the drawings, Fig. 1 shows in perspective in diagrammatic form two sheets of woven fabric spaced apart, one above the other, but in about the relative overlapped positions they will occupy when put together and cemented;

A preferred material from which to manufacture this product is a fabric woven from fine glass fibers. An example of this product is known in the market today as "Fiberglas," a prodct of the Owens-Corning Fiberglas Corporation.

Figure 1:
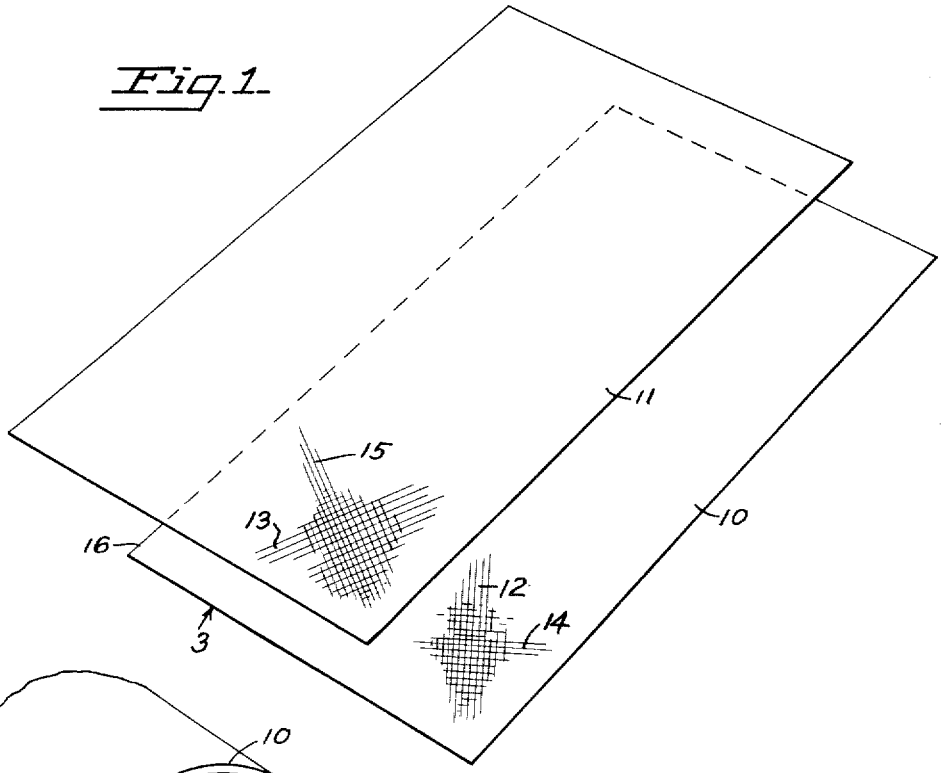

Two of these sheets are illustrated at 10 and 11 in the drawings, in which the warp is indicated by the lines 12 and 13, respectively, and the woof by the lines 14 and 15. By cutting these pieces 10 and 11 in this way and putting them together in about the relative positions shown in Fig. 1, the warp thread 12 crosses the warp thread 13 in opposite directions at about an equal angle so that it gives equal stress and strain when subjected to bending or to an expanding pressure. In this way no one thread is taking more strain than another, and the forces are equalized.

The exact angle at which the warp threads 12 and 13 lie with respect to the axis of the duct or the sides 16 and 17 of the fabric sheets is immaterial except that it is important to get the angle that best suits the particular size of duct being made. These ducts are made over a mandrel and one important thing is to have the duct when formed removable by sliding along and off the mandrel. The closer the angle of the warp threads 12 and 13 approaches to 45° with relation to the sides 16 and 17, the easier it will pull on the mandrel. Good results have been obtained where the angle between the warp threads 12 and 13 and the sides 16 and 17 respectively is about 31°. It is not the intention, however, to limit the invention to that particular angle. The important thing is that the warp threads 12 and 13 shall not extend exactly parallel with the sides 16 and 17 of the fabric sheets. One reason for this is that the duct will lose its bending quality if the warp threads extend substantially parallel with the axis of the duct.

[One very wide usage to which this duct is being put is in the heat-conveying systems on the B-29

Boeing bomber used in the current war. The invention has proven exceptionally valuable in this installation, where it has replaced metal ducts, one of which fractured at a critical time and caused the loss of one B-29 in the first raid on Tokyo. The result was the grounding of all B-29's on Saipan until sufficient sets of the duct described herein could be flown out and installed in the B-29's based there.]

In [the] use [described above], the temperature of the air being forced through the duct reaches 400° F. to 500° F. To make it possible to stand this high temperature the invention provides for the material which is used to seal the pores in the fabric to be enclosed between the two glass fiber layers 10 and 11 so that substantially none of it extends through to the inside 18 of the duct. This provides a substantially glass lined flexible duct.

Figure 3:
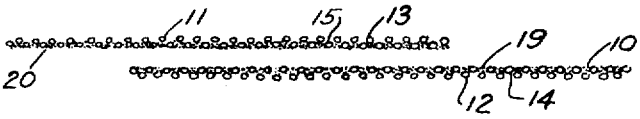
Fig. 3 is a view in vertical elevation of the end of the two sheets of fabric taken in the direction of the arrow 3 in Fig. 1, just before they are put together and cemented.

Very good results have been obtained from coating the sheets 10 and 11 with a high-heat-resistant neoprene-based synthetic. As shown in Fig. 3 this neoprene coating 19 and 20 is applied on the faces of the sheets 10 and 11 which are to be bonded together. When so coated the two sheets 10 and 11 shown spaced one above the other in Fig. 3 are compressed together in about the same relative overlapped position as shown in Fig. 3. They are then formed over a mandrel into a tube which may be round or square or oblong in cross-sectional shape. For illustration purposes a round mandrel has been used.

Figure 4:
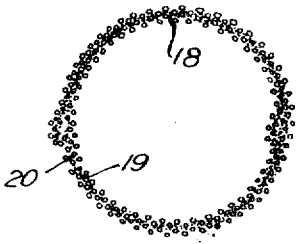
Fig. 4 is an end elevational view of the duct shown only diagrammatically.

Fig. 4 shows an end cross-sectional view of the formed duct with the neoprene coating materials 19 and 20 locked in between the two layers of glass woven fabric where these coatings are protected and are allowed to accomplish their cementing and sealing function without direct contact with the hot gases being forced through the duct.

Figure 2:
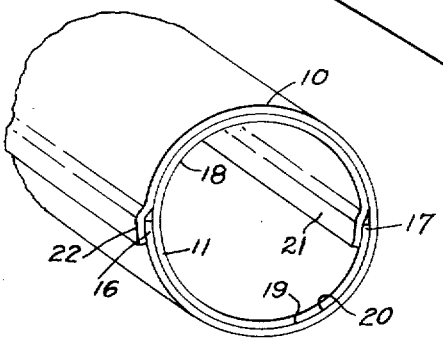
Fig. 2 is a diagrammatic cross-sectional view in partial perspective showing the sheets formed up into a duct.

For clarity of illustration of the feature of how these layers are assembled, the diagrammatic showing of Fig. 2 is provided. The inner layer of fabric 11 is arranged with its edge 21 lapped over the other edge 17. The outer layer of fabric 10 is arranged with its edge 22 lapped over and secured to its other edge 16. Thus we have the tubular duct made from the two pieces of woven glass fabric 10 and 11 having the neoprene coating 19 and 20 locked between the two pieces and having the joints 17—21 and 16—22 along substantially opposite sides of the duct and formed by the lap of each layer or piece upon itself, thereby providing a tubular flexible glass duct having no coated area exposed to the materials passing through the duct.

In order to equalize the stresses and bending qualities of the duct it is preferable to have these lapped seams opposite each other.

If it should be desirable, the outer surface of the duct may be given a protective coating of one sort or another; but this is a matter of choice. When so coated, a high-heat-resistant resin may be applied where it is desired to give the duct a certain stiffness or rigidity.

Figure 5:
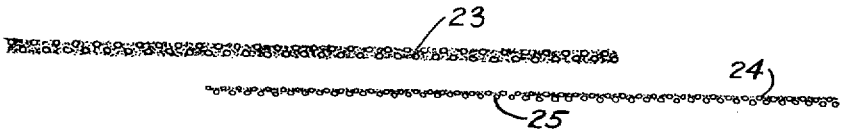
Fig. 5 is a view in vertical elevation similar to Fig. 3, of the end of the two sheets of fabric showing a modification particularly adapted to a duct conveying gases of high pressure.
Figure 6:
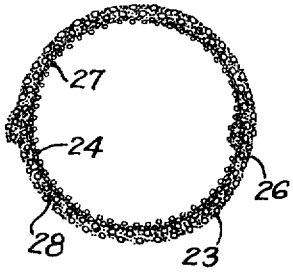
Fig. 6 is a view in end elevation of the duct of Fig. 5 when completed.
Figure 7:
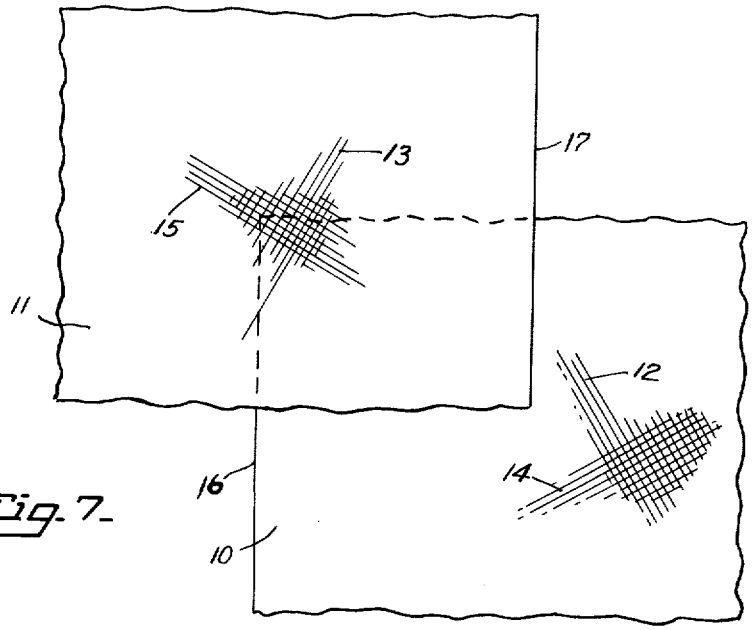
Fig. 7 is a plan view of portions of the sheets showing a preferred form of a warp and woof arrangement.

A preferred, and the most economical and efficient, form of the duct is shown in Figs. 5 and 6. Here the sheet of woven glass fabric 23 which is to become the outside layer is made of #164 "Fiberglas" and is preferably prepared by dipping in a neoprene synthetic coating so that both its sides are coated and the pores are well sealed. The sheet of woven glass fabric 24 which is to become in effect the glass lining of the duct is coated only on one side, the side which is to be secured to the outer layer 23. This leaves the side 25 substantially uncoated and having a flexible glass surface. Preferably this inner sheet 24 is made of #128 "Fiberglas" having a finer mesh than that used for the outer layer 23. The result is a duct having a coated sealed outer surface 26, an uncoated flexible glass lined surface 27, and a protected layer 28 of synthetic sealing material locked between the layers 23 and 24. An outstanding advantage of this construction is less porosity and therefore the duct is able to convey gases at a higher pressure. Another advantage is in lower cost over making the inside layer 24 of the same weight as the outside layer 23. By having the layers of different mesh count the bonded sheets are less porous.

The claims are:

1. The improved article of manufacture consisting of an impervious, bendable, high-heat-resistant duct composed of a pair of sheets of fibre glass cloth each sheet having its warp and woof threads extending at less than a right angle to a plane normal to the axis of said duct, and having said sheets united and sealed by a flexible binding material which is substantially confined between said sheets whereby any gases flowing in said duct are in contact primarily with the untreated surface of said fibre glass cloth.

2. The improved article of manufacture consisting of an impervious, bendable, high-heat-resistant duct composed of a pair of sheets of fibre glass cloth each sheet having its warp and woof threads extending at less than a right angle to a plane normal to the axis of said duct, and with the warp and woof threads of one sheet extending generally at opposite equal angles to the axis from those of the corresponding warp and woof threads of the other sheet, and having said sheets united and sealed by a flexible binding material which is substantially confined between said sheets whereby any gases flowing in said duct are in contact primarily with the untreated surface of said fibre glass cloth.

3. A duct including in combination a pair of sheets of glass woven fabric bonded together through the medium of a layer of high-heat-resistant, flexible material applied only to the contacting faces of said sheets and in which each sheet is joined along its edge by being lapped onto itself.

4. A tubular duct made from two pieces of woven glass fabric having one side only of each piece coated with a neoprene synthetic filling agent and with these coated sides pressed together and having a joint along substantially opposite sides formed by a lap of each piece on itself, thereby to provide a tubular duct having no neoprene synthetic coated area exposed to materials passing through the duct.

5. A tubular duct made from two pieces of woven glass fabric having both sides of the outer layer and the outside of the inner layer coated with a neoprene coated filling agent and with the contacting coated sides pressed together and having a joint along substantially opposite sides formed by a lap of each piece on itself, thereby to provide a tubular duct having no neoprene coated area exposed to materials passing through the duct.

6. A tubular duct made from two pieces of woven glass fabric of different mesh count having both sides of the outer layer and the outside of the inner layer coated with high-seat-resistant, flexible material and with the contacting coated sides formed by a lap of each piece on itself, thereby to provide a substantially glass lined, impervious, and flexible duct having no coated area exposed to materials passing through the duct.

7. The improved article of manufacture consisting of an impervious, bendable, high-heat-resistant duct composed of a pair of sheets of fibre glass cloth of different mesh count, each sheet having its warp and woof threads extending at less than a right angle to a plane normal to the axis of said duct, and with the warp and woof threads of one sheet extending generally at opposite equal angles to the axis from those of the corresponding warp and woof threads of other sheet, and having said sheets united and sealed by a flexible binding material which is substantially confined between said sheets whereby any gases flowing in said duct are in contact primarily with the untreated surface of said fibre glass cloth and a similar material coating the outside surface of said duct, whereby porosity is further reduced.

8. The improved article of manufacture consisting of an impervious, bendable, high-heat-resistant duct composed of a plurality of sheets of fiber glass cloth, each sheet having its warp and woof threads extending at less than a right angle to a plane normal to the axis of said duct, and having said sheets united and sealed by a flexible binding material which is substantially confined between said sheets and to the outside of the outer sheet, whereby any gases flowing in said duct are in contact primarily with the untreated surface of said fiber glass cloth, and in which each sheet is joined along its edge by being lapped onto itself.

FRED A. GREENWALD.

REFERENCES CITED

The following references are of record in the file of this patent or the original patent:

UNITED STATES PATENTS

| Number | Name | Date |
|---|---|---|
| 1,237,031 | Hadfely | Aug. 14, 1917 |
| 1,628,832 | Falor | May 17, 1927 |
| 2,076,456 | Gams et al. | Apr. 6, 1937 |
| 2,225,026 | Welsh | Dec. 17, 1940 |
| 2,360,109 | Converse | Oct. 10, 1944 |

FOREIGN PATENTS

| Number | Country | Date |
|---|---|---|
| 548,458 | Great Britain | Oct. 12, 1942 |

Certificate of Correction

Reissue No. 23,317 January 2, 1951

FRED A. GREENWALD

It is hereby certified that error appears in the printed specification of the above numbered patent requiring correction as follows:

Column 2, line 42, for the words "pull on" read *pull off*; column 4, lines 73 and 74, for "high-seat-resistant" read *high-heat-resistant*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*